Patented Mar. 27, 1951

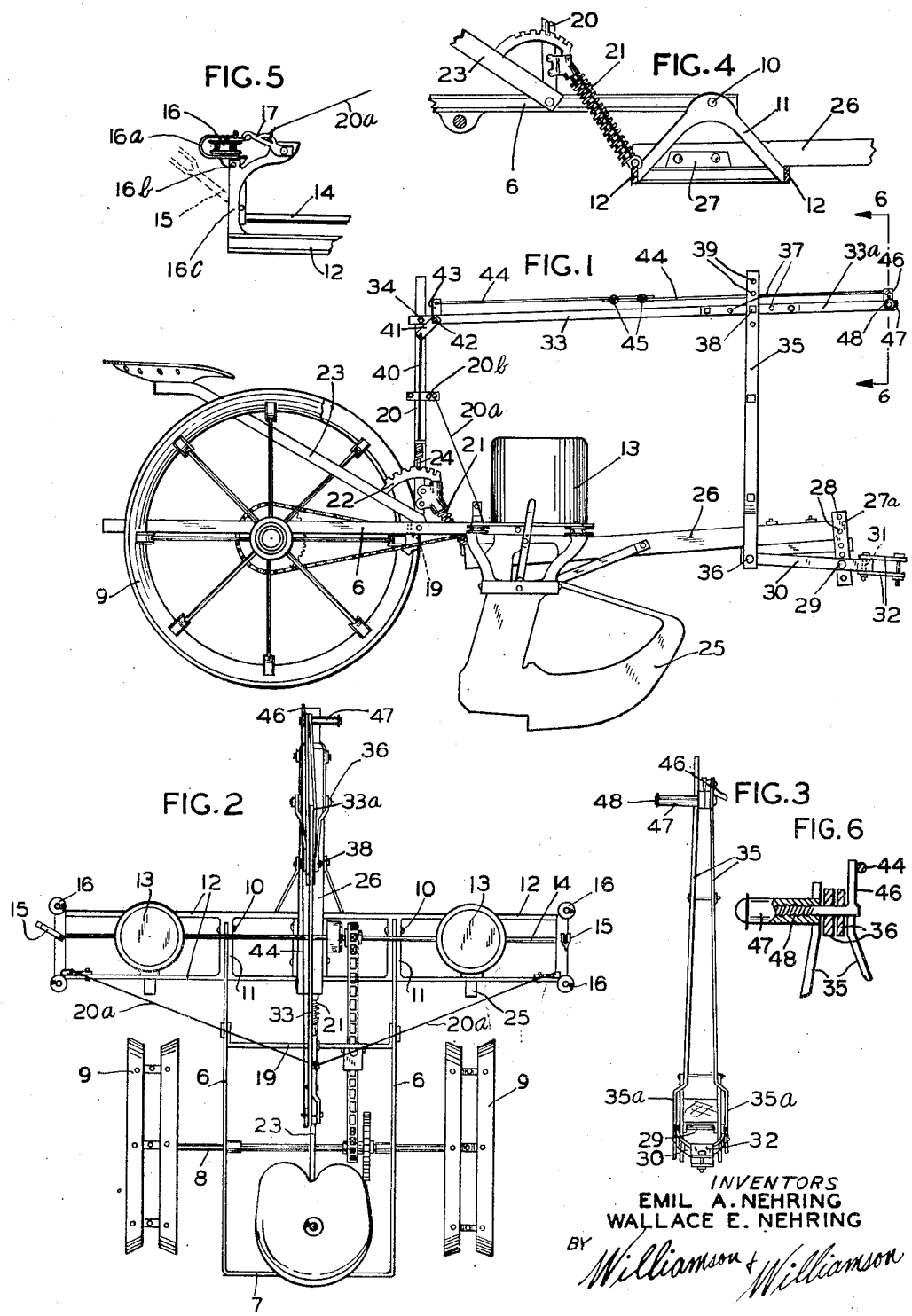

2,546,231

UNITED STATES PATENT OFFICE 2,546,231

PLANTER FRAME AND CONTROL THEREFOR

Emil A. Nehring and Wallace E. Nehring,
Elmore, Minn.

Application November 4, 1946, Serial No. 707,648

3 Claims. (Cl. 97—236)

1

This invention relates to corn planters and more particularly to a planter and an attachment therefor which facilitates use of the planter with a tractor behind which it is connected and which can be controlled by the person occupying the driver's seat of the tractor.

A general object of the invention is to provide means for raising and lowering the planter runner and simultaneously disconnecting the check wire from the driver's seat of a tractor where the planter is attached to and drawn behind the tractor.

A further object of the invention is to provide apparatus of the type described above which permits an ordinary horse drawn planter to be quickly adapted for connection behind a tractor without requiring an operator on the seat of the planter.

A further object of the invention is to provide an attachment for converting a horse-drawn to a tractor-drawn planter wherein said attachment can be readily applied to a conventional type of horse-drawn planter without any considerable reconstruction of the planter.

The above and other objects and advantages of the invention will more fully appear from the following description made in connection with the accompanying drawings, wherein like reference characters refer to the same parts throughout the views, and, in which:

Figure 1 is a side elevational view of a planter utilizing an embodiment of the invention, a portion of the near rear wheel of the planter being broken away;

Figure 2 is a plan view of the planter;

Figure 3 is a front elevational view of the forward end of the planter and the control mechanism;

Figure 4 is an enlarged fragmentary longitudinal sectional view of the planter frame and a portion of the runner tilting or raising mechanism;

Figure 5 is an enlarged fragmentary view of the check wire feeder mechanism, a portion of which is shown in alternate positions in dotted lines; and Fig. 6 is a sectional view on an enlarged scale taken along line 6—6 of Fig. 1.

The planter includes side frame members 6 connected at their rear ends by a cross member 7 and suitably mounted upon an axle 8 having wheels 9 on its ends. The frame side portions 6 extend forwardly as shown in Figures 2 and 4 and are provided with pivotal connections 10 with V-shaped brackets 11 forming portions of a cross

2 frame unit 12. The customary seed dispensers 13 are mounted upon the cross frame 12. A feed control rod 14 extends transversely of the main frame members 6 to connect with the seed dispensing mechanism at the bottom of the seed dispenser units 13 in a manner not shown but well understood in the art. A forked lever 15 extends upwardly from each end of the dispenser actuation shaft or rod 14, said forked lever being shown in full lines in Figure 5 in its operative position adjacent a pair of wire feeding pulleys 16 at each end of the transverse frame members 12. The pulleys 16 are supported by brackets 16a which are connected at 16b to upright members 16c which are mounted on the transverse frame members 12, the brackets 16a permitting the pulleys 16 to tilt outwardly when a spring catch 17 is moved out of engagement with said brackets 16a.

An intermediate main frame cross member 19 extends between the main frame side members 6 and pivotally supports an upwardly extending lever 20. The lever 20 is connected by a link 21 to the rearward transverse subframe member 12, and said lever 20 is maintained in any one of a number of desired positions by means of a curved rack 22 supported by a seat brace 23 and a spring pressed dog 24 which is mounted on the upwardly extending lever 20. Wires 20a extend from the spring catches 17 to a clamp bracket 20b mounted on an intermediate portion of the lever 20.

Extending downwardly from the transverse frame members 12 are planter runners indicated generally at 25. When the lever 20 is shifted forwardly and rearwardly it will cause lowering or raising of the runners 25 relative to the ground and to the ground wheels 9.

A drawbar 26 has its rear end connected to the transverse frame members 12 by means of bracket elements ears 27 which span the frame members 12 at their central portions. The forward end of the drawbar 26 has a draft connection element 27a thereon with a plurality of apertures 28 to selectively receive a bolt 29 which in turn connects the member 27 to a draft connection element 30 whose forward end is connected by a vertical pivot 31 to a pair of connector strips 32. It will be noted that the draft connection 30 extends rearwardly of its horizontal pivotal connection 29. Extending forwardly from the upper portion of the upwardly extending lever 20 is an elongated link 33 which is pivotally connected to said lever 20 at 34. The forward end of said link 33 is supported by a pair of upward extending strips 35 which have spread lower ends 35a which are pivotally connected at 36 to the rearwardly extending end of the draft connection element 30. The link 33 has a longitudinally adjustable forward extension 33a which is provided with a plurality of apertures 37 to permit longitudinal adjustment of said extension 33a relative to the link 33. A pivot bolt 38 extends through one of a plurality of apertures 39 in the upwardly extending supporting strips 35 to permit vertical adjustment of the link 33 relative to the element 35, and, of course, also extends through an aligned aperture in the link 33 as well as through one of the apertures 37 in the link extension 33a. A dog operating rod 40 has its lower end connected to the dog 24 to cooperate with the curved rack 22. The upper end of the rod 40 is connected to an arm 41 of a bell crank lever which is pivotally connected at 42 to a rearward portion of the link 33. The other bell crank arm 43 has a rod 44 connected thereto, said rod being split intermediate its ends and provided with clamps 45 which permit longitudinal adjustment of said rod 44. The forward end of the rod 44 is connected to a crank arm 46 mounted on a pivot pin 47 which supports a handle 48 in such a manner that it can be partially rotated relative to the link extension 33a through which the pivot 47 extends. By twisting the handle 48 so as to cause it to rotate on the pivot pin 47, the crank arm 46 will be brought forwardly and it in turn will draw the rod 44 forwardly to draw the lower end of the arm 41 upwardly.

The forward draft connection including the elements 32 is secured to a tractor drawbar. A check wire not shown is pressed in the pivot fork 15 and lies to the right of the check wire rollers 16 shown in Figs. 2 and 5. As the implement is lined up with the row to be planted the handle 48 is grasped and partially turned to release the dog 24 from the curved rack 22 shown in Fig. 1, whereupon the linkage 33, 33a and the lever 20 are pulled forwardly to lower the runner 25 in the ground. The tractor is then propelled over the ground and the planting operation is carried out in the customary manner. When the operator reaches the end of a row and wishes to turn around and begin a new row in the opposite direction, he pushes the linkage 33, 33a and lever 20 rearwardly after releasing the dog 24 by twisting the handle 48, thereby raising the runner 25 from the ground, and at the same time the wires 20a are pulled to release the catch 17 and permit the rollers 16 and their mountings 16a to tilt outwardly and release the check wire. Preparatory to beginning a new row the check wire is reset by hand in the usual manner.

From the foregoing description it has been seen that we have provided a very simple yet extremely efficient attachment for ordinary horse-drawn planters which permits their use with a tractor, and whereby raising and lowering of the planter's runners and release of the check wire can be accomplished from the seat of the tractor. Installation of the attachment is very simple and while slight variations in the form of the control attachment may be necessary for different makes of planters, it will, of course, be understood that such changes can be made without departing from the scope of the invention.

What we claim is:

1. In a corn planter, a frame, a drawbar extending forwardly from said frame, a connection between said frame and said drawbar permitting relative movement between the two in a vertical direction, a runner frame supported by and extending downwardly from said drawbar, a lever extending upwardly from said frame and connected thereto for pivotal movement on a horizontal axis, a second lever pivotally connected to said drawbar and extending upwardly therefrom in forward, substantially parallel spaced relation to said first mentioned lever, a member disposed above said frame and drawbar and pivotally connected to the upper ends of said levers, the forward end of said member extending a considerable distance forwardly beyond said second mentioned lever, an adjustable catch assembly having a portion thereof connected to said frame adjacent said first mentioned lever and having a cooperating portion operatively associated therewith and mounted on said first lever, a movable handle on the forward end of said member, and an operating connection for said catch assembly connected between said handle and a portion of said catch assembly.

2. The structure in claim 1 and said operating connection having a portion extending from said catch assembly and upwardly adjacent said first mentioned lever, and said operating connection having another portion extending longitudinally of and adjacent said member, and a connection between said portions of said operating connection at a point adjacent the pivotal connection between said first mentioned lever and said member.

3. The structure in claim 1 and said member and said second mentioned lever being provided with adjustable connecting means whereby the connection between them can be selectively adjusted longitudinally of said member.

EMIL A. NEHRING.
WALLACE E. NEHRING.

REFERENCES CITED

The following references are of record in the file of this patent:

UNITED STATES PATENTS

| Number | Name | Date |
|---|---|---|
| 575,642 | Giffin | Jan. 19, 1897 |
| 662,621 | Harding | Nov. 27, 1900 |
| 664,767 | Lincoln | Dec. 25, 1900 |
| 722,442 | Anderson | Mar. 10, 1903 |
| 729,552 | Davis | June 2, 1903 |
| 1,131,897 | Bartholomew | Mar. 16, 1915 |
| 2,097,841 | Park | Nov. 2, 1937 |
| 2,107,723 | White | Feb. 8, 1938 |